United States Patent [19]

Schikarski et al.

[11] Patent Number: 5,477,901
[45] Date of Patent: Dec. 26, 1995

[54] APPARATUS FOR THE MANUFACTURE OF HIGH PRESSURE LAMINATES

[75] Inventors: Horst J. Schikarski; Klaus Baranowski, both of Weinham, Germany; Charles Kosa, Toronto, Canada; Gert Muller, Michelstadt-Steinbuch; Reinhold Rudolf, Obernburg-Eisenbach, both of Germany; Dennis Colyer, Newmarket, Canada

[73] Assignees: Resopal GmbH, Grob-Umbstad, Germany; Pathex International Ltd., Don Mills, Canada

[21] Appl. No.: 107,766

[22] PCT Filed: Sep. 18, 1991

[86] PCT No.: PCT/EP91/01774

§ 371 Date: Aug. 24, 1993

§ 102(e) Date: Aug. 24, 1993

[87] PCT Pub. No.: WO92/15449

PCT Pub. Date: Sep. 17, 1992

[30] Foreign Application Priority Data

Mar. 7, 1991 [DE] Germany ............... 41 07 249.9

[51] Int. Cl.⁶ ............... B32B 31/04; B32B 31/18; B32B 31/20
[52] U.S. Cl. ............... 156/498; 156/264; 156/267; 156/288; 156/307.4; 156/510; 156/512; 156/516; 156/517; 156/538; 156/539; 156/580; 156/583.1; 198/803.3; 198/803.9; 226/173; 271/7; 271/205
[58] Field of Search ............... 156/307.4, 311, 156/538, 539, 580, 583.1, 553, 543, 256, 264, 267, 288, 308.2, 498, 510, 512, 516–517, 581, 219; 226/173; 271/7, 205; 100/215–216, 93 P; 198/803.3, 803.9

[56] References Cited

U.S. PATENT DOCUMENTS

| | | | |
|---|---|---|---|
| 1,329,936 | 2/1920 | Spiess | 271/205 |
| 2,557,492 | 6/1951 | Young | 226/173 X |
| 3,073,499 | 1/1963 | Middleton, Jr. et al. | 226/173 X |
| 3,100,637 | 8/1963 | Brown | 271/205 |
| 3,193,881 | 7/1965 | Kostur | 226/173 X |
| 3,726,389 | 4/1973 | Klein et al. | 271/205 X |
| 3,738,556 | 6/1973 | Grebe | 226/173 |
| 3,828,997 | 8/1974 | Snow . | |
| 3,909,343 | 9/1975 | Posselt . | |
| 3,977,535 | 8/1976 | Husges et al. . | |
| 3,987,917 | 10/1976 | Husges et al. . | |
| 4,372,899 | 2/1983 | Wiemann et al. . | |
| 4,392,909 | 7/1983 | Bohn et al. | 156/498 X |
| 4,543,147 | 9/1985 | Noto et al. | 156/583.1 X |
| 4,848,533 | 7/1989 | Martin et al. | 198/803.9 X |
| 5,035,134 | 7/1991 | Fisch | 198/803.9 X |

FOREIGN PATENT DOCUMENTS

| | | |
|---|---|---|
| 975671 | 10/1975 | Canada . |
| 1255470 | 6/1989 | Canada . |
| 2048221 | 12/1980 | United Kingdom . |

OTHER PUBLICATIONS

International Preliminary Exam. Report from PCT Office dated Sep. 18, 1991.

*Primary Examiner*—Adrienne C. Johnstone
*Attorney, Agent, or Firm*—Vidas Arrett & Steinkraus

[57] ABSTRACT

For the manufacture of high pressure laminates, the pressed laminate (4) consisting of a stack of artificial resin impregnated paper sheets is fed into a single daylight hot press. The pressed laminate is held and guided along both longitudinal edges (6) by transfer clamps (7), which are connected to an endless rotating chain (8) and are conveyed on guide tracks (15). The transfer clamps (7) remain closed during the transfer into the single daylight hot press, during the pressing process and during a following cooling process in a cold press.

13 Claims, 4 Drawing Sheets

1

APPARATUS FOR THE MANUFACTURE OF HIGH PRESSURE LAMINATES

FIELD OF INVENTION

This invention relates to a process for the manufacture of high pressure laminates from artificial resin impregnated paper sheets in a single daylight hot press, whereby the pressed laminate consisting of paper sheets is held at several positions on both of its longitudinal edges by longitudinal moving clamp fixtures as it is transferred into or out of the single daylight hot press.

BACKGROUND OF THE INVENTION

High pressure laminates, particularly decorative laminates according to DIN 16926, (German Industrial Code) are manufactured from artificial resin impregnated paper sheets which are pressed in a hot press under high pressure. Usually, multi-daylight presses are used, which are fed with the desired cut to size, pressed laminate on carrier plates and placed between caul plates. Every press cycle, which consists of the heating and cooling of the press platens, requires a time period of about 1–2 hours. The necessity, at every press process, to use a large number of caul plates, imposes considerable cost related expenditures. The cyclical heating and cooling of the pressed boards leads to a high energy requirement.

In addition, there is a known process for manufacturing laminates (pressed boards) continuously in endless double-belt presses. In this case, the laminate supplied from an unwind stand is pressed between steel belts. The surface texturing in this case is accomplished by means of simultaneously running embossed paper webs, since the engraving of the steel belts and their conversion to different surface structures would be uneconomical.

The pressures attainable with double-belt presses are considerably lower than those attainable with discontinuous presses. In a known process of the initially named class (DE-PS 2 217 396), a single daylight hot press is used. The laminate for the manufacture of a single high-pressure laminate (pressed board) is picked up along its two longitudinal edges by two clamping strips which transfer the laminate into the hot press and release it there. After the pressing process, the laminate is again picked up by clamping strips and transferred out of the hot press. For that purpose, the clamping strips are moved back and forth in transfer direction. In that fashion only a single work station, namely the hot press, can be operated with the clamping strips. During each transfer process the laminate must be picked up against and released. During this process the laminate can be displaced.

SUMMARY OF THE INVENTION

It is the object of the invention to design a process of the initially named class in such a way that even relatively thin high-pressure laminates (pressed boards) can be manufactured with high pressures but with very short press strokes, which ensures the exact guidance of the laminate.

According to the invention, this objective is achieved by the clamping means consisting of individual transfer clamps attached to endlessly rotating transfer strands and that the laminate is continuously held and guided by the transfer clamps during the pressing process into the single daylight hot press and during transfer out of the single daylight hot press.

Since the laminate is constantly held and guided by the transfer clamps, there is not risk that prior to the pressing process the individual sheets are displaced in relation to each other or that the laminate is displaced in relation to the caul plates. This ensures that in the case of decorative laminates (pressed boards) the orientation of a possible decorative design is in accordance with the surface structure produced by the caul plates.

Through the exact and uninterrupted guidance of the laminate before, during and after the pressing process, an uneven temperature stress of the laminate is prevented with certainty.

A preferred embodiment of the invention provides for the laminate to be taken over by the transfer clamps in a loading station and transferred in stages into the single daylight hot press and into a subsequent cold press, while the transfer clamps remain closed.

This allows not only the maintenance of constant process parameters during hot pressing, but also during the subsequent cooling, thus ensuring a consistently high quality of the produced laminates (pressed boards).

A further embodiment of the scope and nature of the invention provides that the laminate after leaving the single daylight hot press or the cold press is transferred through a trimming station in which the longitudinal edges held by the transfer clamps are trimmed.

On the other hand, the continuous guidance of the laminate by the transfer clamps facilitates the continuous trimming of the longitudinal edges; on the other hand it facilitates that the laminates (pressed boards) keep their exact orientation even during the trimming process, which ensures that the trimmed edges run parallel to any possible decorative design and/or texture in the surface.

The exact guidance of the laminate in the hot press sector means not only that a very low cycle time can be chosen for the heating process, but also that the selected heating period can be exactly maintained, which is of crucial importance to laminates quality. According to another embodiment of the scope and nature of the invention, the manufacturing time can be further reduced by the double utilization of the time period provided for the heating cycle, when the laminate consists of two stacks of synthetic-resin impregnated paper sheets with separator foil inserted between them, which are jointly picked up and held by the transfer clamps.

The invention facilitates the suspended loading of the laminate into the hot press. After being loaded, the press is closed in such a way that the laminate has simultaneous contact with the hot platens. This ensures the uniform heating of the laminate.

The invention also relates to an apparatus for implementing the process according to the invention. This apparatus, which is provided with a single daylight hot press containing a top and a bottom hot platen to each of which caul plates are attached, and with clamping means for holding and transferring the laminate by its two longitudinal edges, is characterized in that the clamping means are individual transfer means, each attached to a common endlessly rotating, driven transfer strand, which extends from a loading station to at least beyond the single daylight hot press.

Preferably the two transfer strands are formed by an endlessly rotating flat-link chain carrying the individual transfer clamps.

According to a preferred embodiment of the invention it is provided that each individual transfer clamp is attached to a clamp cart that is guided along guide tracks in transfer direction and is connected with one link of the flat-link chain. This facilitates the very accurate guidance of the individual transfer clamps, whereby the occurring transverse forces and the forces for carrying the laminate are supported at the guide tracks and do not stress the endlessly rotating transfer strand, for example the flat-link chain.

Other advantageous embodiments of the scope and nature of the invention are subject of further subclaims.

DESCRIPTION OF DRAWINGS

One advantageous embodiment of the invention is described below with reference to the drawings, as follows.

DESCRIPTION OF INVENTION

Figure 1:
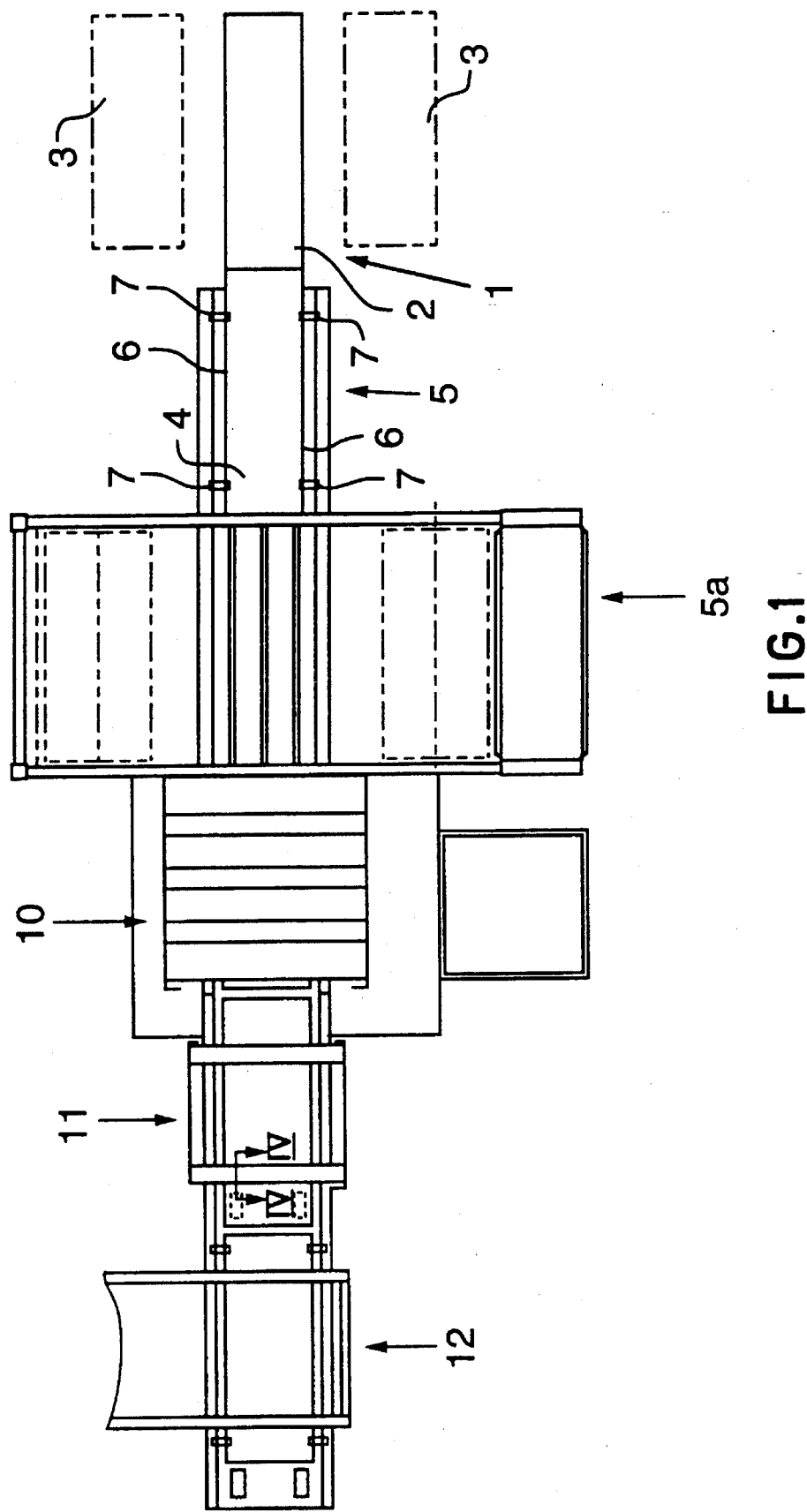
FIG. 1 is a simplified top view of an apparatus for manufacturing high-pressure laminates (pressed boards)
Figure 2:
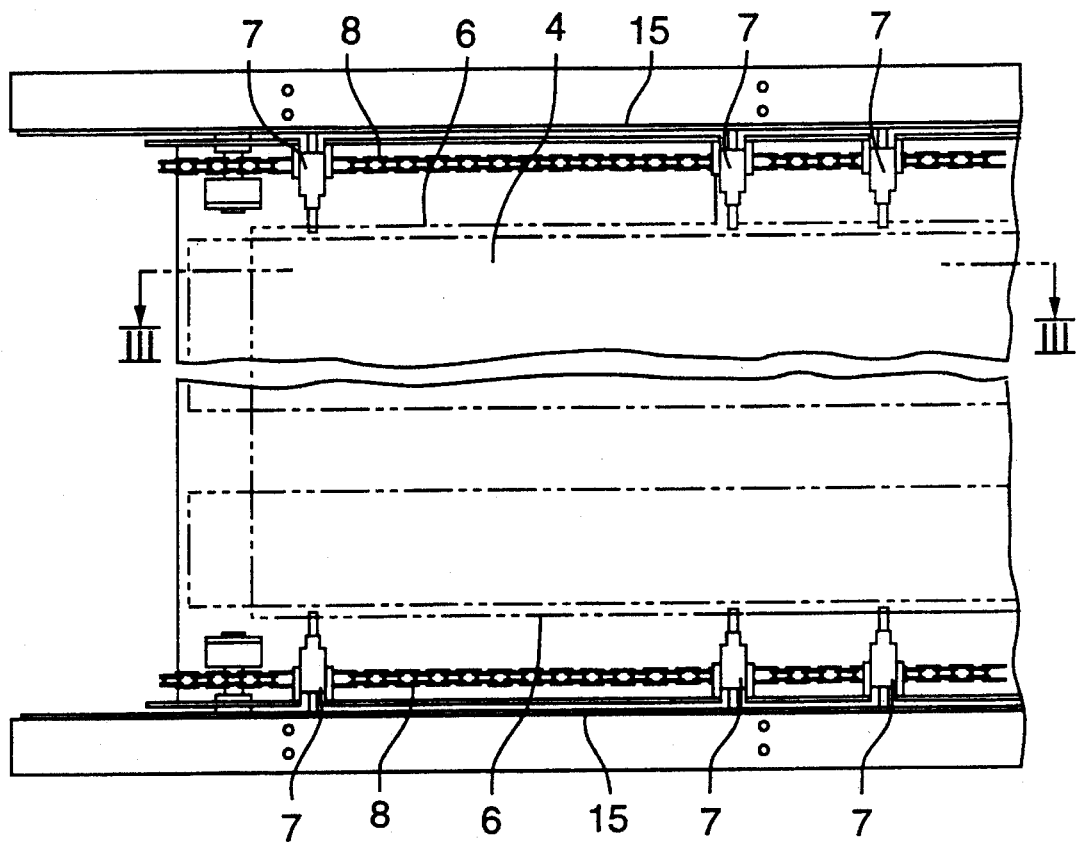
FIG. 2 is a top view of a loading station of the apparatus according to FIG. 1.

The apparatus according to the present invention is generally illustrated in FIG. 1. The apparatus for the manufacture of high pressure laminates consists of a preparation station 1, a conveyor belt 2, racks 3, a loading station 5, a caul plate change station 5a, a single daylight press 10, a cold press 11 and an exit table 12. The components of the apparatus are substantially longitudinally aligned in a transfer direction.

The conveyor belt 2 extends from the under the racks 3 to the loading station 5. Conveyor belt 2 is mounted on rollers which are rotatably mounted on a frame which can be raised and lowered and has a motor for driving one of the rollers.

As shown in FIG. 2–5, chains 8 extend along each side of conveyer belt 2 between sprockets 9 presenting an endless chain. Chain 8 runs from the loading station 5 through caul plate change station 5a through the single daylight hot press 10, through cold press 11 and up to exit table station 12. Spaced along chain 8 are transfer clamps 7.

Figure 3:
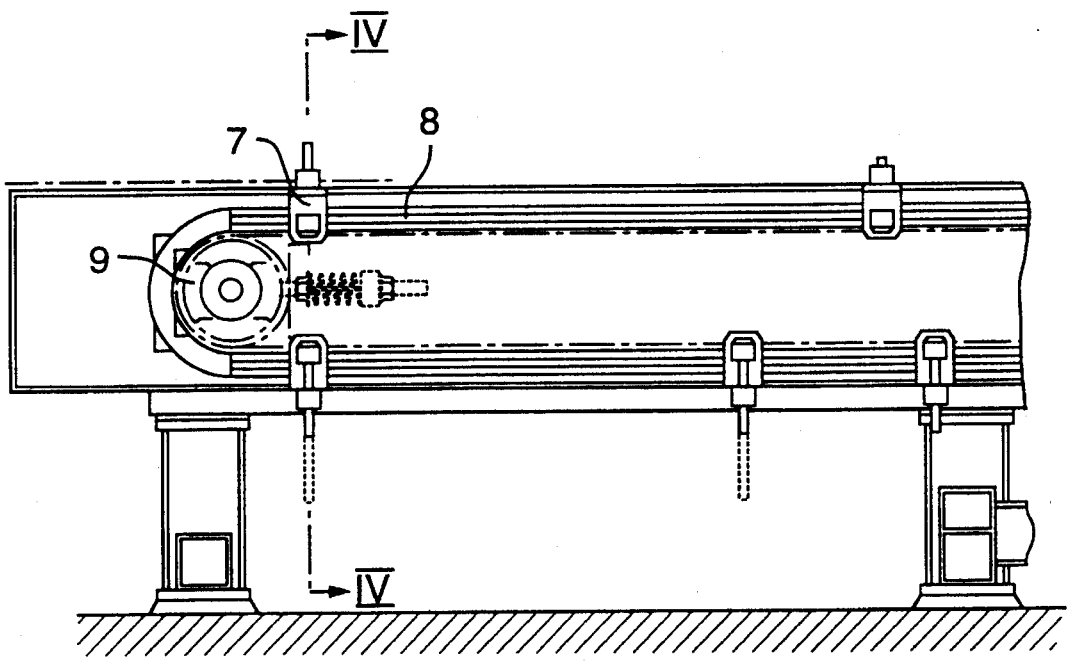
FIG. 3 is a section along the line III—III in FIG. 2.

At each end of endless chain 8 sprockets 9 are rotatably mounted on an axle. The axle is mounted on a sliding block which may be slid along a track for tensioning chain 8, as illustrated in FIG. 3. The tensioner provides the tensioning force to maintain chain 8 with suitable tensioning. Extending about the circumference of sprocket 9 but spaced between the sprocket and frame 16 is cam surface.

Figure 4:
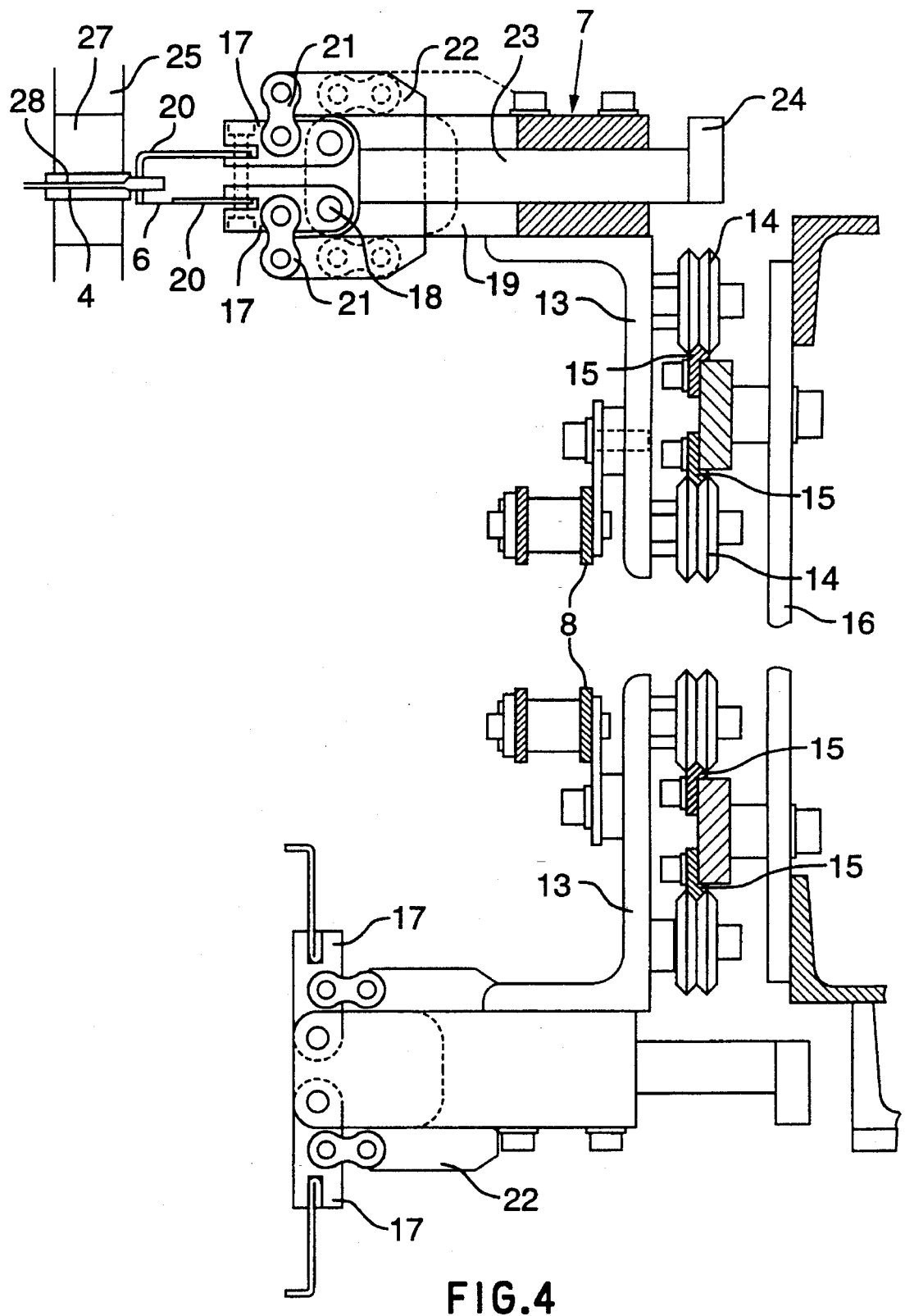
FIG. 4 is an enlarged partial section along line IV—IV in FIG. 3.

Referring to FIG. 4, each transfer clamp 7 is connected to clamp cart 13. Each clamp cart 13 has an L-shaped body having guide rollers 14 rotatably mounted thereon at opposite ends of the longer arm of clamp cart 13. Clamp cart 13 is pivotally linked to a link of chain 8 between the mountings of guide roller 14.

Guide track 15 is mounted on frame 16. Frame 16 extends along each side of the apparatus substantially parallel from along side of loading station 5 through caul plate change station 5a, single daylight press 10, cold press 11 and along side of exit table 12. Frame 16 is suitably mounted to a base surface.

Each transfer clamp 7 has two plier like clamping legs 17. Clamping legs 17 are pivotally mounted to arms of bracket 19 at pivot 18. Clamping legs 17 each have an L-shaped tongue 20 extending from the end opposite pivot 18.

Bracket 19 has a rod 23 which is slidably mounted within bracket 19. The base of bracket 19 is mounted onto clamp cart 7 by bolts.

Rod 23 extends beyond the base of bracket 19. At the remote end of rod 23 is control cam 24. At the opposite end of rod 23, locking slide 22 is rigidly mounted and adapted for sliding with rod 23. Toggle links 21 are pivotally connected with locking slide 22 and pivotally connected to clamping legs 17 at a point thereof intermediate the ends.

Rod 23 slides within bracket 19 between a clamped position and an unclamped position. In a clamped position, rod 23 is fully within bracket 19 pushing locking slide 22 past pivot 44 causing clamping legs 17 to be closed together. Tongues 20 are urged together providing a clamping force at the remote ends of the tongues.

In an open position, rod 23 is retracted from bracket 19 pushing locking slide 22 away from pivot 44 using toggle links 21 to pivot, causing clamping legs 17 to be open. Tongues 20 are urged apart releasing the clamping force at the remote ends of the tongues.

In closed condition, the transfer clamp 7 is clamped between the reciprocally angled ends of the tongue 20 and the longitudinal edges 6 of the laminate 4.

To reciprocate transfer clamps 7 between the clamped position to the open position, a cam surface will direct the cam 24 back and forth as chain 8 rotates about sprockets 9. As is apparent the cam surface at the upstream end of the endless chain will cause the cam to move rod 23 to a clamped position. The cam surface at the downstream transfer end of the endless chain will cause the cam to move rod 23 to an open position.

Figure 5:
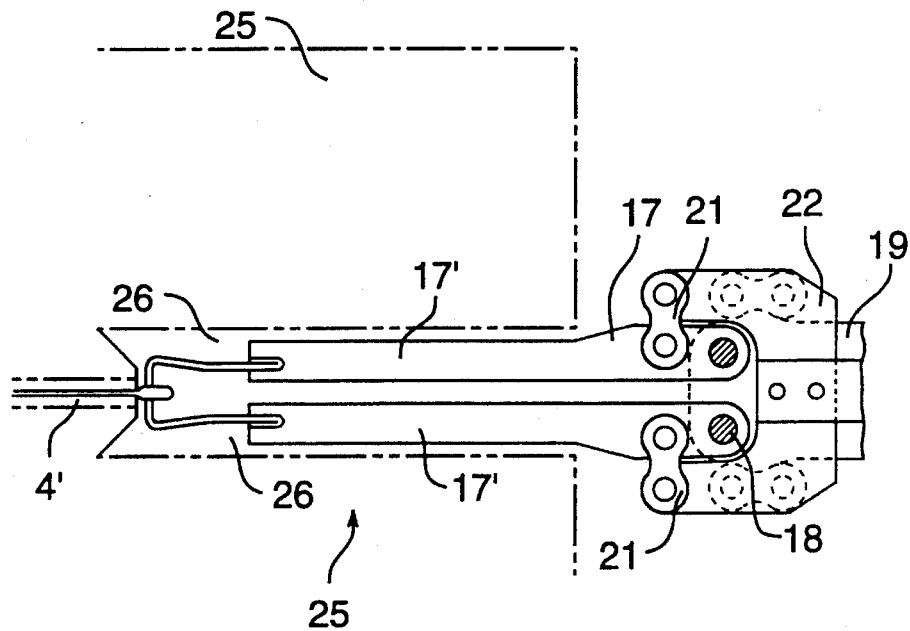
FIG. 5 is a partial section similar to FIG. 4 with the clamping legs of the transfer clamps replaced by enlarged versions.

In FIG. 5, the clamp shanks can be interchanged for longer clamping legs 17' in comparison with clamping legs 17. Longer clamping legs 17' are used if the laminate 4' has a smaller width than laminate 4.

In FIG. 5, the phantom lines show the extent of the hot platens 25 of the single daylight hot press 10. The surface of the platens 25 have lateral recesses 26 to accommodate the longer clamping legs 17'. If the hot platens 25 are used to its full width, then the recesses 26 can be filled and covered by fitted adapters 27, as illustrated in FIG. 4. The adapters 27 can be held in place by magnets in recesses 26. Thus the clamping legs are designed so that their length can vary to accommodate different laminate widths.

Artificial resin impregnated sheets 6 are placed in a stack to form laminate 4. The paper sheets are drawn out from compartments from racks 3 or drawn from an unwind stand. With an unwind stand, the plastic impregnated paper rolls are rolled out and are cut to the desired lengths by a transverse cutting fixture.

The composition of laminate 4 can vary. For decorative laminates, one decorative paper sheet is laminated to a core paper sheet. In addition, the decorative paper sheet can be covered with an overlay sheet. Normally, two sheets of artificial resin impregnated paper sheets are stacked between a separator foil or a separator sheet 5.

The conveyor belt 2 transfers the laminate 4 from the preparation station 1 onto a loading station 5. The conveyor belt is raised to the height of the clamps 7 and the laminate is stretched width wise. The conveyor belt 2 is lowered so that the laminate is raised above the conveyor belt.

The transfer clamps 7 are closed while the sheets of laminate are on the loading station 5. The transfer clamps are opened only after the laminate has travelled the full extend and has arrived at the exit table 12.

Figure 6:
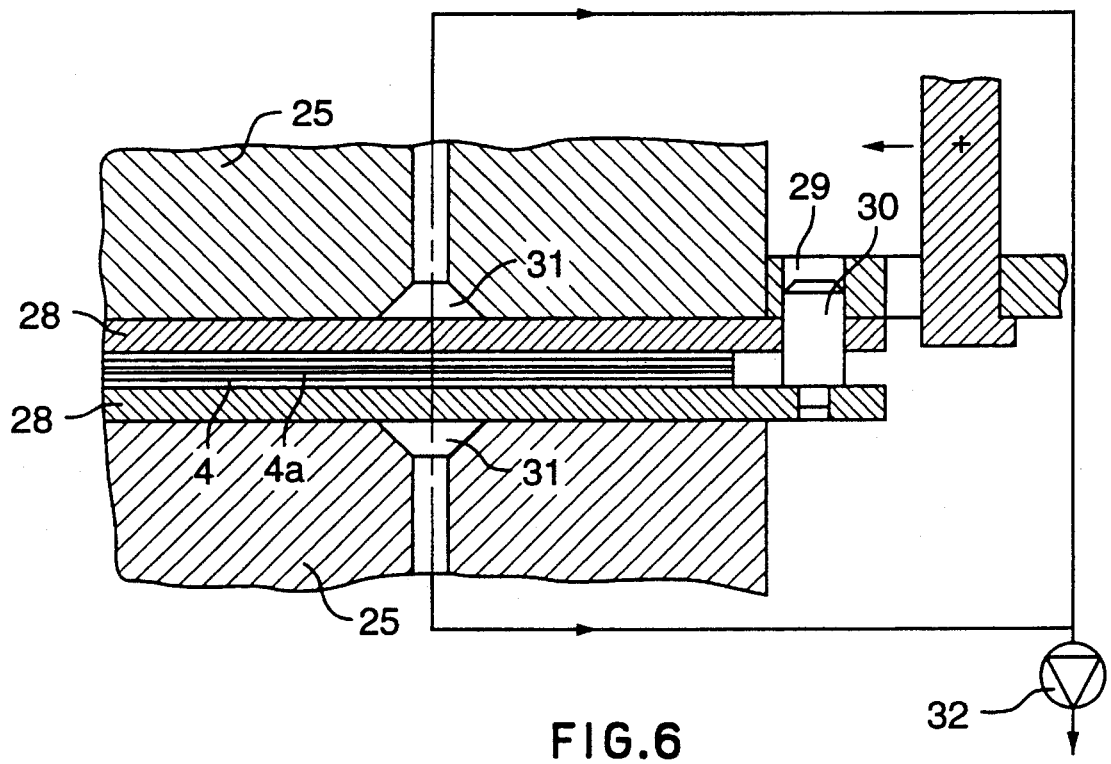
FIG. 6 is an enlarged partial longitudinal section of the hot press along line VI—VI in FIG. 1.

FIG. 6 illustrates the hot press 10 having caul plates 28. The laminate is moved in a transfer direction until the front edge abuts with centering pin 30 extending from centering holes 29 and the longitudinal edges of the laminate coincide with the longitudinal edges of the hot platens 25. Hot platens 25 have a plurality of vacuum holes 31 in the surface thereof which is connected to vacuum, for example, a vacuum pump. Caul platens 28 are retained on the face of the platens 25 by virtue of the vacuum.

A special advantage of transfer clamps is that the laminate 4 can be transferred into the hot press and then into the cold press 11 without the layers of the laminate slipping relative to each other. The cooling under pressure results in a smooth, flat, finished high pressure laminated sheet. The loss of gloss on the decorative surface is greatly reduced as the laminate is not exposed to rapid evaporation.

In order to avoid brittleness of the edges of the laminate 4, the cold platens of the cold press 11 are designed smaller in size than the hot platens 25.

The single daylight hot press 10 is a fast closing press having dimensions so that even the largest format of laminate, 1545 mm×3700 mm, and a pressure of at least 100 bar can be exerted. The cut-outs 70 are 110 mm deep and the press area can be reduced to 1325 mm×2700 mm.

The exit table station 12 can be supplied as a longitudinal trimming station. Alternatively, the exit table station 12 can be followed with a trimming station. The laminate is transported to the trimming station after leaving the cold press 11. The longitudinal edges 6 that are held by the transfer clamps 7 are separated by trimming knives.

Although the disclosure describes and illustrates the preferred embodiments of the invention, it is understood that the invention is not limited to these particular embodiments. Many variations and modifications will now occur to those skilled in the art. For definition of the invention, reference is made to the appended claims.

We claim:

1. In an apparatus for the manufacture of high-pressure laminates made of several layers of synthetic-resin impregnated paper sheets laminated under heat and pressure in a single daylight hot press, the paper sheets being continuously clamped along both of its longitudinal edges by longitudinally movable clamping means, characterized in that the clamping means comprises two longitudinally extending transfer strands for effecting transfer of said paper sheets through said apparatus, each of said transfer strands having a plurality of transfer clamps (7) each comprising
    a clamp cart engaging said transfer strand,
    a pair of tongues pivotally mounted to said clamp cart, and
    a locking slide slidable mounted on said clamp cart and linkedly connected to each of said tongues whereby reciprocal sliding of said locking slide effects opening and closing of said tongues for clamping and unclamping a longitudinal edge of said paper sheets.

2. In an apparatus as claimed in claim 1, wherein said transfer strands each comprises an endless chain mounted about sprockets.

3. In an apparatus as claimed in claim 2, wherein said apparatus further comprises two guide tracks, each extending along in a transfer direction on each side of said laminate and adapted to receive said clamp carts while said clamp carts travel along.

4. In an apparatus as claimed in claim 3, wherein each of said clamp cart further comprises guide rollers for rolling along said guide tracks.

5. In an apparatus as claimed in claim 4, wherein said tongues are mountable on clamp shanks with interchangeable different lengths.

6. In an apparatus as claimed in claim 1, wherein said apparatus comprises a loading station, a cold press following said single daylight hot press and a trimming station, said paper sheets are layered in said loading station, said single daylight hot press has a top and bottom hot platen with caul plates attached thereto, the longitudinal edges that are held by the transfer clamps are trimmed at said trimming station.

7. In an apparatus as claimed in claim 6, wherein said impregnated paper sheets are removed from an unwind stand and are cut to a desired length by a transverse cutting apparatus.

8. In an apparatus as claimed in claim 7 wherein the laminate comprises two stacks of artificial resin impregnated paper sheets with a separator sheet placed between and together said stacks are grasped and held by the transfer clamps.

9. In an apparatus as claimed in claim 6, wherein said hot platens have side cut-outs for receiving the clamp means.

10. In an apparatus as claimed in claim 9, wherein said apparatus for includes adapters for closing said cut-outs.

11. In an apparatus as claimed in claim 10 wherein said adapters are magnetically secured within the cut-outs.

12. In an apparatus as claimed in claim 6, wherein the caul plates run on its longitudinal edges parallel with longitudinal edges of the hot platens, that the caul plates are centered on the front edge of the hot platens and that the hot platens have a plurality of vacuum openings connectable to a negative pressure source for hold the caul plates.

13. In an apparatus as claimed in claim 12, wherein the cold press has cold platens that are smaller in area than the hot platens of the single daylight hot press.

* * * * *